April 7, 1931.  N. I. DYRENKOV  1,799,220
REVERSIBLE TRANSMISSION FOR LOCOMOTIVES
Filed June 4, 1930  3 Sheets-Sheet 3
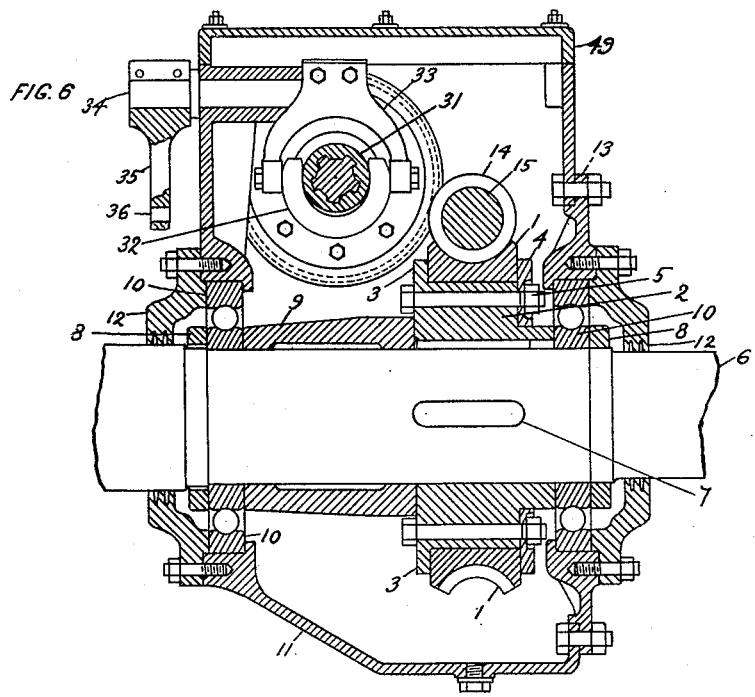
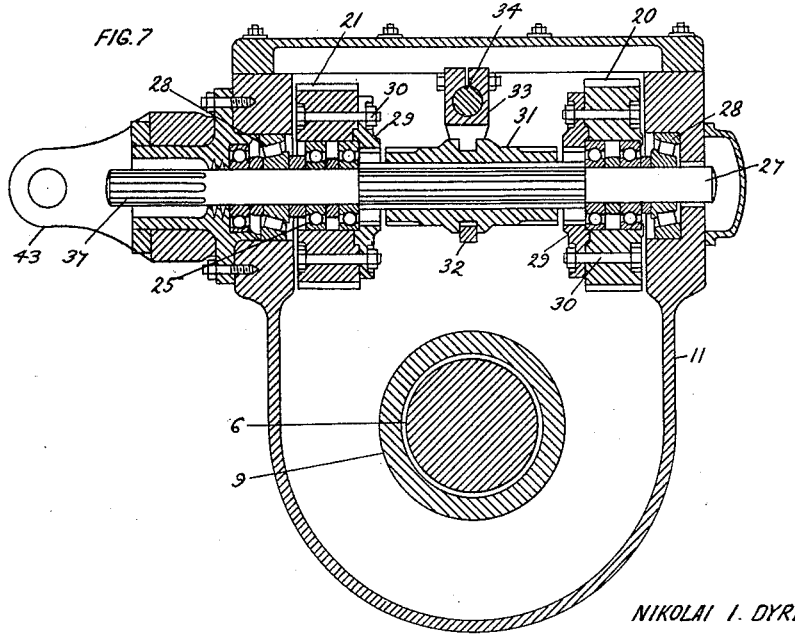
NIKOLAI I. DYRENKOV
INVENTOR
BY John P. Mironov
ATTORNEY Patented Apr. 7, 1931

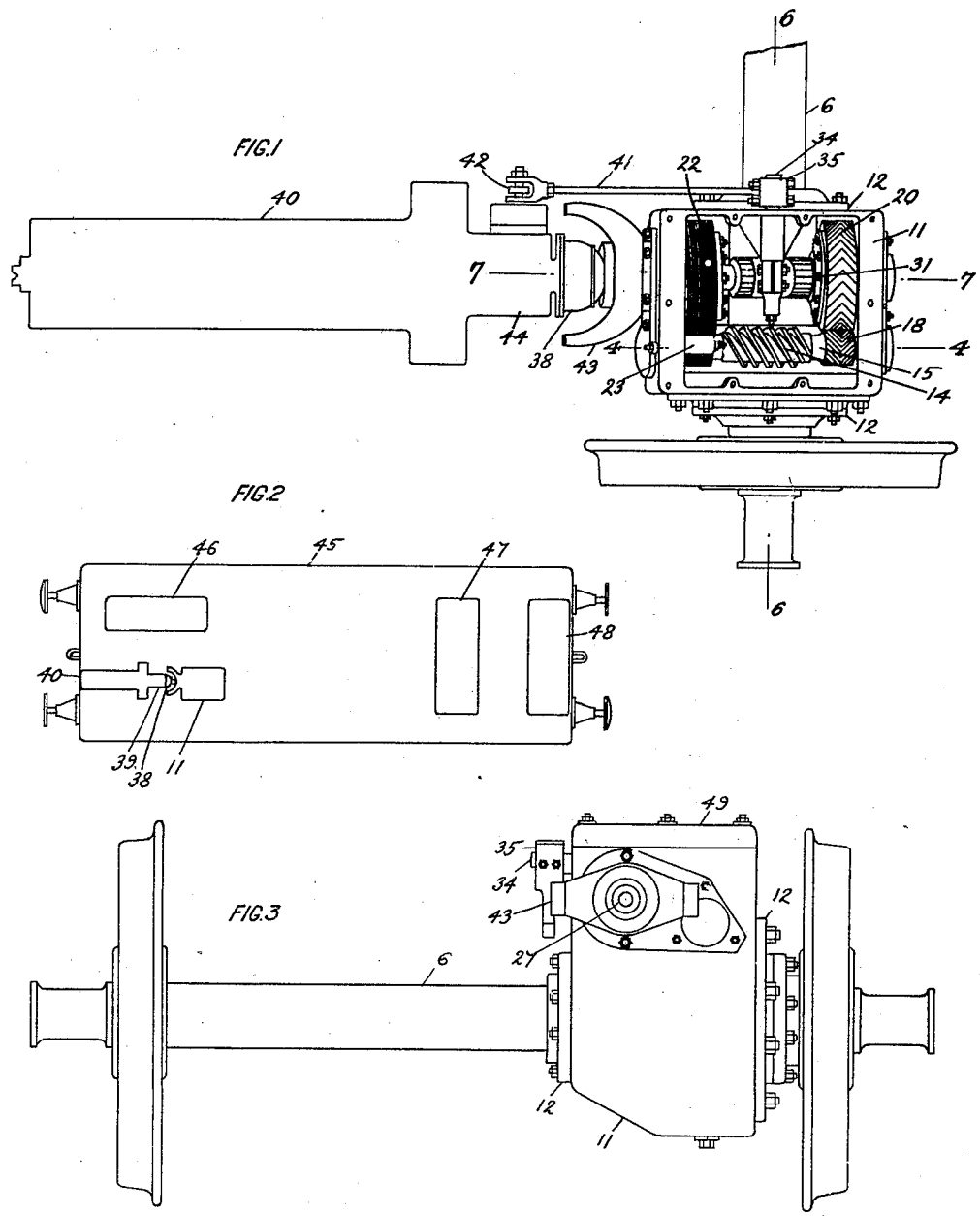

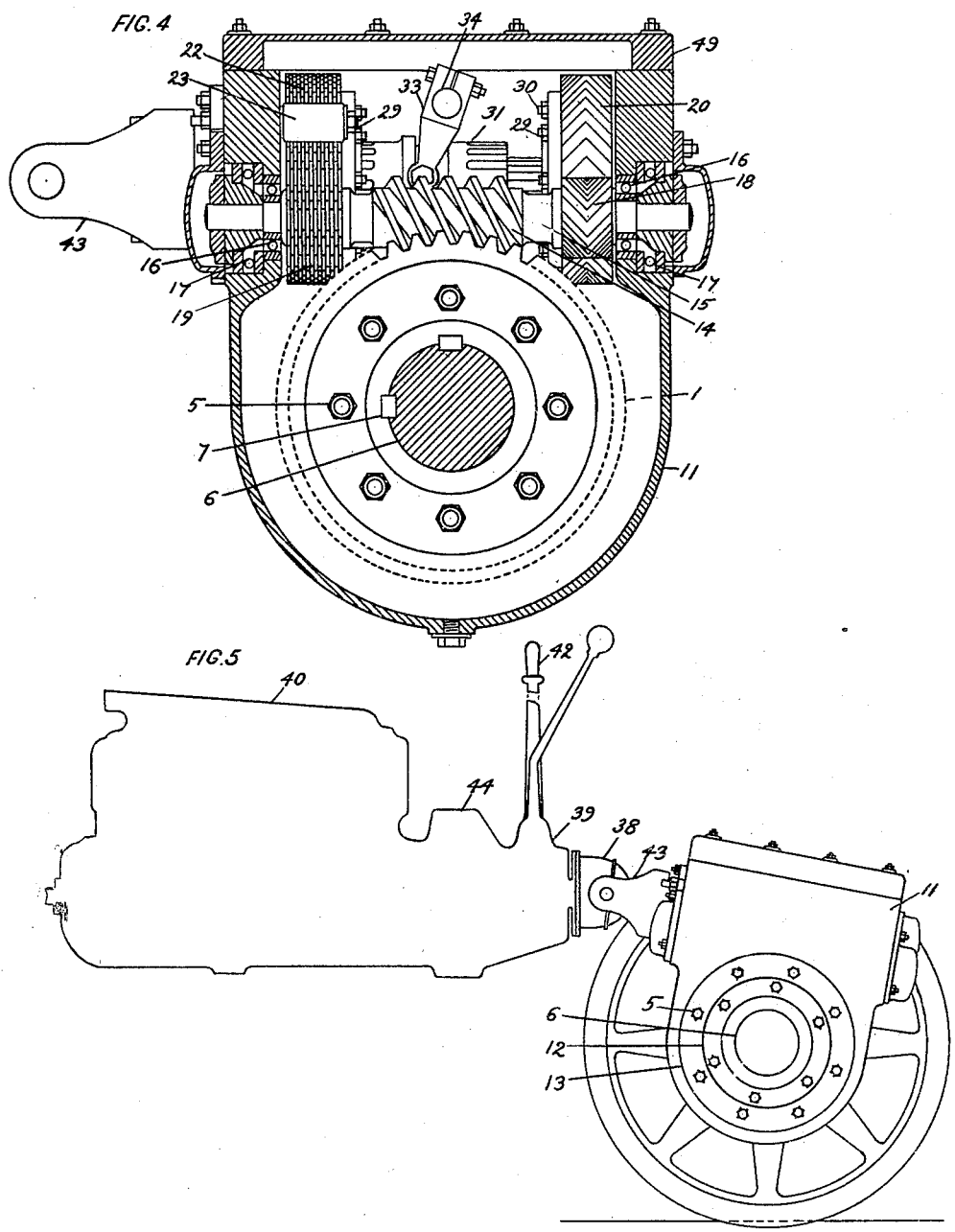

1,799,220

UNITED STATES PATENT OFFICE

NIKOLAI I. DYRENKOV, OF ODESSA, UNION OF SOVIET SOCIALIST REPUBLICS

REVERSIBLE TRANSMISSION FOR LOCOMOTIVES

Application filed June 4, 1930, Serial No. 459,172, and in the Union of Socialist Soviet Republics April 17, 1929.

My invention relates to reversible transmissions and has particular reference to transmissions employing a combination gear and chain drive.

The object of my invention is to provide a transmission suitable for mounting on a driving axle of a self propelled vehicle and, especially, for locomotive axles of ordinary design.

Another object of my invention is to provide a transmission in which the gears are always in mesh and the change of connections is made by means of a jaw clutch, so that the gear teeth are saved from a possible clash and damage which occur in mechanisms using meshing shifting gears.

Still another object of my invention is to provide an arrangement for adapting an ordinary locomotive frame for an internal combustion engine without changing the construction of the body, its axles and of the drawbar arrangement.

Ordinary gasoline or oil locomotives usually have a complicated and expensive construction being of an entirely special construction. In my design I am using equipment specially adapted for mounting on locomotives or cars of a standard construction.

My invention is more fully described in the accompanying specification and drawings in which—

Fig. 1 is a plan view of my transmission on a locomotive, partly in section, Fig. 2 is a diagrammatic plan view of a locomotive with my equipment, Fig. 3 is a side view of my transmission on a locomotive axle, Fig. 4 is a section 4—4 (Fig. 1), Fig. 5 is an elevation of my transmission showing also an engine, Fig. 6 is a section 6—6 (Fig. 1), and Fig. 7 is a section 7—7 (Fig. 1).

My transmission consists of a worm gear 1 or gear ring mounted on a gear holder 2 on which it is retained by a flange 3 and a ring 4 with bolts 5. The holder is mounted on an axle 6 of a locomotive or similar self propelled vehicle, with keys 7.

The axle 6 has threads for nuts 8 with which the gear holder 2 is clamped with a bushing 9 and ball bearings 10 between them. The ball bearings support a gear housing 11 with removable end covers 12 and 13. The cover or ring 13 is of a larger diameter so as to permit the insertion of the gear 1 in its place upon removal of the covers and of one of the locomotive wheels from the axle 6.

A worm pinion 14 cut on the worm shaft 15 is in mesh with the gear 1 and is supported in bearings 16 in the walls of the housing 11. Thrust bearings 17 serve to prevent the axial displacement of the worm shaft. The worm shaft has also a pinion (or gear) 18 on one end and a chain sprocket 19 on the other. The pinion 18 is in mesh with a gear 20. The sprocket 19 is engaged by a silent chain 22 driven by a sprocket 21.

The gear 20 and the sprocket 21 are rotatively mounted on ball bearings 25 and 26 on a driving shaft 27 supported in bearings 28 in the walls of the housing 11. Internal jaw clutch rings 29 are attached to the sides of the gear 20 and sprocket 21 with bolts 30. The middle portion of the shaft 27 is splined for a sliding jaw clutch bushing or sleeve 31 the ends of which are provided with jaws adapted to fit the jaws of the rings 29. The sleeve 31 has a groove in the center for a collar 32 with trunnions engaged by the ends of a shifting fork 33 attached to a shifting rod 34 which is rotatively supported in the wall of the housing 11. A handle 35 with a pivot hole 36 is connected with a shifting rod or link 41 extending from the engineer's control handle 42.

The end of the driving shaft has splines 37 for connecting it with a coupling or universal joint 38 of a transmission 39 of a power plant 40.

A fork 43 is attached to the end of the transmission or gear case 11 and is supported on the frame or chassis of the locomotive for stabilizing the gear case 11 and preventing same from rotating or tipping over on the axle 6.

The power plant 40 with its gear box 44 can be set at one side of a locomotive or motor car 45 so as not to interfere with the regular arrangement of a drawbar passing through the center of the vehicle. It is understood, of course, that the engine can be placed in the center if the frame is specially designed for same.

In order to save the space the ordinary cooling radiator can be dispensed with and the cooling water for the engine jackets can be pumped from a storage tank 46 placed on the other side of the locomotive in order to balance the weight of the engine. A second tank 47 of a larger size is placed in the rear of the locomotive together with a fuel tank 48.

With my arrangement it is possible to install the internal combustion engine on a locomotive of an ordinary construction, of a standard and well adapted for the railroad service design. The equipment can be easily removed for replacement or repairs. The gear case is split lengthwise and is provided with a removable cover 49, so that the gears can be easily inspected, lubricated or repaired. Upon removal of the gear case the shafts and gears can be easily removed without removing the wheels or the axle.

I claim as my invention:

In a reversible transmission, the combination with a gear adapted to be mounted on an axle of a vehicle, of a pinion for said gear, a shaft for said pinion, a gear and a sprocket wheel on said shaft, a driving shaft in a parallel alignment with said first shaft, a pinion on said second shaft in mesh with said shaft gear, a sprocket wheel on said second shaft, a chain connecting said sprocket wheels, means to selectively connect said driving shaft with said gear or said sprocket, a housing enclosing said gears and said shafts and rotatively mounted on said axle, one end of said driving shaft extending through said housing, an extension on said housing concentric with said shaft extension, and a stabilizing fork rotatively mounted on said housing extension.

In testimony whereof I affix my signature.

NIKOLAI I. DYRENKOV.